(12) United States Patent
Geyer et al.

(10) Patent No.: US 7,730,857 B2
(45) Date of Patent: Jun. 8, 2010

(54) INTERNAL COMBUSTION ENGINE WITH AIR FILTER SHIELD PREVENTING SOILING

(75) Inventors: Werner Geyer, Berglen (DE); Björn Scherraus, Wildberg-Effringen (DE); Lukas Zürcher, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 352 days.

(21) Appl. No.: 11/743,370

(22) Filed: May 2, 2007

(65) Prior Publication Data
US 2007/0272188 A1 Nov. 29, 2007

(30) Foreign Application Priority Data
May 23, 2006 (DE) .................. 10 2006 024 078

(51) Int. Cl.
*F02M 1/02* (2006.01)
(52) U.S. Cl. ..................................... 123/65 P
(58) Field of Classification Search ...............................
123/183.21–184.61, 179.6, 198 E, 65 PD, 123/65 WV; 261/36.2, DIG. 36; 251/36.2, 251/DIG. 36
See application file for complete search history.

(56) References Cited

U.S. PATENT DOCUMENTS

| 3,969,445 | A  | * | 7/1976 | Vogelsang | .................. 261/44.7 |
| 6,889,637 | B2 | * | 5/2005 | Rosskamp | .............. 123/73 PP |
| 2001/0018898 | A1 |  | 9/2001 | Raffenberg | |
| 2002/0109244 | A1 | * | 8/2002 | Nickel | ........................ 261/64.6 |
| 2002/0135083 | A1 |  | 9/2002 | Maier | |
| 2003/0106508 | A1 | * | 6/2003 | Rosskamp | .............. 123/73 PP |
| 2004/0012102 | A1 |  | 1/2004 | Gerhardy | |

* cited by examiner

*Primary Examiner*—M. McMahon
(74) *Attorney, Agent, or Firm*—Gudrun E. Huckett

(57) ABSTRACT

An internal combustion engine has a carburetor and an intake channel for supplying fuel and combustion air, wherein a section of the intake channel is formed in the carburetor. At least one fuel opening is provided that opens into the intake channel within the carburetor. The intake channel has an intake opening that is connected to a clean chamber of the air filter of the internal combustion engine, wherein the internal combustion engine takes in air through at least one filter element of the air filter. A choke element is arranged in the clean chamber and moveable into a choke position and into an open position. In the open position, the choke element shields the at least one filter element.

9 Claims, 3 Drawing Sheets

INTERNAL COMBUSTION ENGINE WITH AIR FILTER SHIELD PREVENTING SOILING

BACKGROUND OF THE INVENTION

The invention relates to an internal combustion engine comprising an intake channel for supplying fuel and combustion air, wherein a section of the intake channel is formed in a carburetor and wherein at least one fuel opening opens into the intake channel within the carburetor. The intake channel is connected by means of an intake opening to the clean chamber of an air filter from where the internal combustion engine takes in air through at least one filter element. A choke element is arranged in the clean chamber and can be moved into a choke position and into an open position.

U.S. 2001/0018898 discloses an internal combustion engine having an intake channel that can be closed off by a choke element arranged in an air filter. In the open state of the choke element, the choke element has been pivoted out of the area of the intake opening that opens into the intake channel. The pivot movement is carried out in the plane of the air filter bottom about an axis that is parallel to the longitudinal axis of the intake channel.

In internal combustion engines of this type, it can happen, as a result of the pulsations occurring during operation within the intake channel, that the fuel/air mixture flows back from the intake channel into the air filter. The fuel that flows from the intake channel into the air filter can cause soiling of the air filter element and thus can cause impairment of the intake action. In order to prevent soiling of the air filter, U.S. 2002/0135083 discloses the arrangement of a baffle wall in the air filter in the area of the intake opening of the intake channel.

SUMMARY OF THE INVENTION

It is an object of the present invention to provide an internal combustion engine of the aforementioned kind that is of a simple configuration and prevents soiling of the air filter in operation.

In accordance with the present invention, this is achieved in that the choke element, when in the open position, shields the filter element relative to the intake opening.

In accordance with the present invention, this is also achieved according to another embodiment in that, viewed in the flow direction, an element with a plurality of passages is arranged between the air filter element and the intake opening that opens into the carburetor.

For an internal combustion engine that has a choke element arranged in the clean chamber of the air filter, it is provided according to the present invention that the choke element in the open position shields the filter element relative to the intake opening. In the open position, the choke element therefore takes over the function of the known baffle wall provided for avoiding soiling of the air filter. Accordingly, for both functions only a single element is required. This results in a simple configuration of the internal combustion engine; soiling of the air filter is prevented.

Advantageously, the carburetor is arranged with one end face of the carburetor housing at the air filter housing. Expediently, the choke element is pivoted about an axis that is transverse to the longitudinal axis of the intake channel and parallel to the end face of the carburetor housing. This arrangement of the pivot axis enables pivoting of the choke element toward the intake opening into the choke position and away from the intake opening into the open position in which the choke element is arranged between intake opening and filter element. Expediently, the pivot axis of the choke element is positioned in the plane of the end face and at a spacing relative to the longitudinal axis of the intake channel. However, it can also be provided that the pivot axis of the choke element is positioned at a spacing from the plane of the end face and on an extension of the longitudinal axis of the intake channel. In this way, the pivot axis of the choke element intercepts the longitudinal axis of the intake channel. In particular, the choke element in the choke position is arranged at the intake opening and substantially closes off the intake opening. In the open position, the choke element is advantageously arranged between the intake opening and the air filter element, viewed in the direction of the longitudinal axis of the intake channel.

A simple configuration of the choke element can be achieved when the choke element has an area that closes off the intake opening in the choke position and is arranged between the intake opening and the air filter element in the open position. However, it can also be provided that the choke element has a first area that closes off the intake opening in the choke position and has a second area that is arranged between the intake opening and the air filter element in the open position of the choke element. In this way, the two areas can be matched well to the different functions.

Advantageously, within the carburetor a partition is arranged in the intake channel and divides the intake channel into a mixture channel and a supply channel for supplying substantially fuel-free air wherein at least one fuel opening opens into the mixture channel. Expediently, on the side of the partition delimiting the mixture channel, a Venturi section is arranged on the partition. It is provided that the internal combustion engine is a two-stroke engine with one cylinder in which a piston is supported that delimits a combustion chamber; the mixture channel opens into a crankcase that is connected by at least one transfer channel in at least one piston position to the combustion chamber; the supply channel supplies to the transfer channel substantially fuel-free combustion air. The arrangement of the partition in the intake channel enables a simple configuration of a two-stroke engine operating with scavenging action. The supply channel supplies the scavenging air to the two-stroke engine and, in this way, the exhaust gas values are reduced. By means of the arrangement of the partition in the intake channel, an additional supply channel with a separate control element for controlling the amount of supplied combustion air can be dispensed with.

Advantageously, the choke element has a flow conducting element that projects into the clean chamber of the air filter and that deflects fuel/air mixture flowing back from the intake channel into the air filter in an outward direction away from the axis of the intake channel. The flow conducting element is advantageously arranged on the partition. In particular, the flow conducting element and the partition can form a unitary part. In this way, the number of required components or parts is reduced. Expediently, the choke element has an annular section with a central opening wherein the central opening, viewed in the direction of the longitudinal axis of the intake channel, is overlapped by the flow conducting element. The overlap of the central opening by the flow conducting element prevents that fuel returning from the intake channel into the air filter can flow back directly straight to the air filter element. The fuel is deflected by the flow conducting element outwardly into the annular section where the fuel will deposit. In order to ensure that the fuel that has precipitated on the annular section flows back into the intake channel, it is provided that the annular section is curved toward the central opening in the direction toward the intake opening. The curvature has the effect that the fuel deposited on the annular section will flow to the edge of the central opening and will be entrained from there by the incoming combustion air into the intake channel. Advantageously, the ring-shaped (annular) section is of rotational symmetry relative to the longitudinal axis of the intake channel.

In order to prevent that large amounts of fuel that pass from the mixture channel into the annular section reach within the annular section an area that is arranged upstream of the supply channel, it is provided that at least one web is arranged on the annular section and the at least one web divides the annular section into a ring half facing the mixture channel and a ring half facing the supply channel. For actuating the choke element, it is provided that at least one section of the choke element is movable in the direction of the longitudinal axis of the intake channel.

In order to prevent soiling of the air filter of an internal combustion engine, wherein the engine has an intake channel for supplying fuel and combustion air and wherein a section of the intake channel is formed within the carburetor into which at least one fuel opening opens and wherein the intake channel is connected by an intake opening to the clean chamber of the air filter from where the internal combustion engine takes in the combustion air through at least one filter element, can be achieved also in that an element with a plurality of passages is arranged between the intake opening that opens into the carburetor and the air filter element, viewed in the flow direction. As a result of the plurality of passages a very large surface area results on which the fuel returning from the intake channel into the air filter can precipitate. The fuel precipitated on the element can be entrained by the combustion air sucked in through the multi-passage element into the internal combustion engine. Such an element protects the air filter in a simple way safely from becoming soiled with fuel.

DESCRIPTION OF THE PREFERRED EMBODIMENTS

Figure 1:
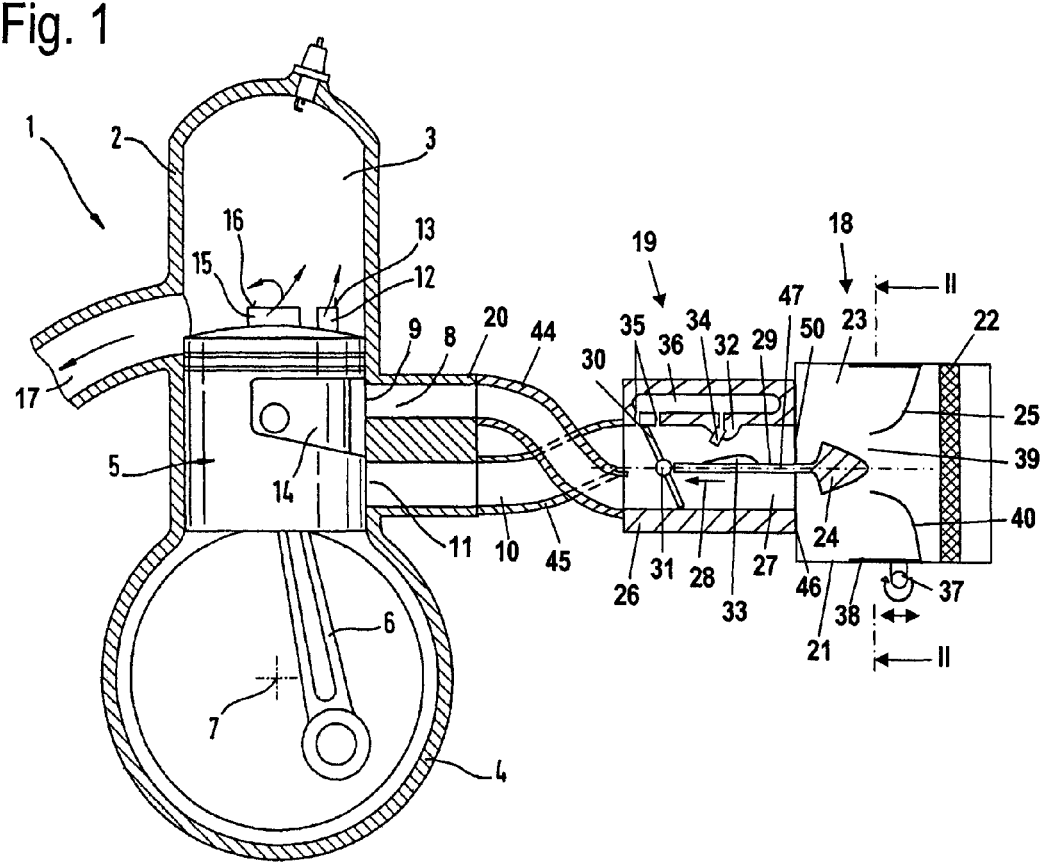
FIG. 1 is a schematic illustration of an internal combustion engine with a choke element in the open position.

The single-cylinder internal combustion engine illustrated in FIG. 1 is a two-stroke engine 1 and serves in particular for driving a tool of a hand-guided power tool such as a motor chainsaw, a cut-off machine, a trimmer or the like. The two-stroke engine 1 has a cylinder 2 in which a piston 5 is reciprocatingly supported. The piston 5 drives by means of a connecting rod 6 a crankshaft 7 rotatably supported in a crankcase 4. The piston 5 delimits a combustion chamber 3 having connected thereto an exhaust 17. A mixture channel 10 with mixture intake 11 opens into the cylinder 2. The mixture intake 11 is arranged on the cylinder 2 and is piston-controlled by the piston 5. Moreover, a supply channel 8 opens with channel intake 9 into the cylinder 2. In any position of the piston 5, the channel intake 9 is separated from the combustion chamber 3 and the crankcase 4.

In the area of the bottom dead center of the piston 5, the combustion chamber 3 is connected to the crankcase 4 by means of two transfer channels 12 arranged symmetrically to the section plane of FIG. 1 and close to the intake and by means of two transfer channels 15 also symmetrically arranged to the section plane of FIG. 1 and close to the exhaust. The intake-near transfer channels 12 open with transfer ports 13 and the exhaust-near transfer channels 15 open with transfer ports 16 into the combustion chamber 3, respectively. In the area of the channel intake 9 the piston 5 has at least one piston recess 14 by means of which the channel intake 9 is connected in the area of the top dead center of the piston 5 to the transfer ports 13 and 16 of the transfer channels 12 and 15.

Figure 2:
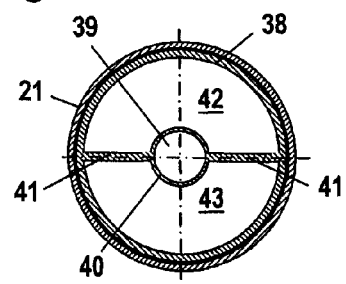
FIG. 2 is a schematic section illustration along the section line II-II in FIG. 1.

The two-stroke engine 1 takes in the combustion air through air filter 18. The air filter 18 has an air filter housing 21 in which a filter element 22 is arranged. The filter element 22 separates a clean chamber 23 provided in the air filter housing 21 from the surroundings. In the clean chamber 23 a choke element 25 is arranged. As also shown in FIG. 2, the choke element 25 has an external cylinder 38 that is only slightly smaller in diameter than the cylindrical air filter housing 21. Therefore, the external cylinder 38 is almost seal-tightly arranged within the air filter housing 21. Additional sealing elements can be provided between the external cylinder 38 and the air filter housing 21. On the external cylinder 38 an annular section 40 is arranged whose outer edge is secured on the external cylinder 38; the annular section 40 delimits with its inner edge the central opening 39. The annular section 40 forms together with the external cylinder 38 an annular channel open in the direction toward the carburetor 19.

In the area of the central opening 39 a flow conducting element 24 is arranged. In FIG. 1, the choke element 25 is shown in the open state. In this state, a gap is formed between the flow conducting element 24 and the annular section 40 of the choke element 25 through which gap the two-stroke engine 1 takes in the combustion air. On the side facing the central opening 39, the flow conducting element 24 is shaped like a rounded cone so that a minimal flow resistance for the incoming combustion air results.

The carburetor 19 is arranged on the air filter 18. An end face 46 of the carburetor 19 is secured on the air filter housing 21. The carburetor 19 has a carburetor housing 26 in which an intake channel 27 is formed. The intake channel 27 has a longitudinal axis 47. The taken-in combustion air flows in flow direction 28 in the intake channel 27. In the intake channel 27 a throttle 30 with throttle shaft 31 is pivotably supported. However, any other kind of throttle element can also be provided in the intake channel 27. The carburetor 19 has a control chamber 36 that is connected to a main fuel opening 34 and auxiliary fuel openings 35. The auxiliary fuel openings 35 open in the area of the throttle 30 into the intake channel 27.

Relative to the flow direction 28, a partition 29 is arranged in the intake channel 27 upstream of the throttle shaft 31. The partition 29 is arranged centrally in the intake channel 27. However, it can also be provided that the partition 29 is arranged off-center within the intake channel 27. The partition 29 divides the intake channel 27 into the supply channel 8 and the mixture channel 10. The auxiliary fuel openings 35 open into the mixture channel 10. The main fuel opening 34 opens into the mixture channel 10 upstream of the auxiliary fuel openings 35. In the area of the main fuel opening 34 a Venturi section 32 is arranged on the intake channel wall. Venturi section 33 is secured on the partition 29. The Venturi section 33 and the partition can be configured as a unitary part.

The intake channel 27 opens with intake opening 50 into the clean chamber 23 of the air filter 18. The flow conducting element 24 is arranged on the partition 29. The flow conducting element 24 and the partition 29 are in particular formed as a unitary part. On the side facing the intake opening 50, the flow conducting element 24 points outwardly away from the longitudinal axis 47 of the intake channel. On the section of the choke element 25 formed by the external cylinder 38 and the annular section 40 an actuating element 37 is arranged with which this section of the choke element 25 can be moved in the direction of the longitudinal axis 47 of the intake channel within the clean chamber 23 of the air filter 18.

The section of the mixture channel 10 formed within the carburetor 19 is connected by connecting channel 45 to an intake flange 20 of the cylinder 2 and the section of the supply channel 8 formed in the carburetor 19 is connected by connecting channel 44 to the intake flange 20. It is also possible to provide separate intake flanges for the supply channel 8 and the mixture channel 10 on the cylinder 2. The connecting channels 44 and 45 are only schematically indicated in FIG. 1. The connecting channels 44, 45 can be formed as separate parts or can be formed as a common part.

As shown in FIG. 2, the choke element 25 has two webs 41 that connect the external cylinder 38 to the annular section 40 and extend parallel to the partition 29. The webs 41 divide the annular section 40 into a ring half 42 that is facing the mixture channel 10 and into a ring half 43 facing the supply channel 8.

In operation of the two-stroke engine 1 fuel/air mixture is taken in from the mixture channel 10 into the crankcase 4 upon upward stroke of the piston 5. In the area of the top dead center of the piston 5 the channel intake 9 is connected by piston recess 14 with the transfer ports 13 and 16, and in the transfer channels 12 and 15 substantially fuel-free combustion air is taken in from the supply channel 8 into the transfer channels 12 and 15. Depending on the operational state the combustion air supplied through the supply channel 8 can contain portions of fuel. In most operating states, the portions of fuel in the combustion air supplied through supply channel 8 is less than the portion of fuel that is supplied through the mixture channel 10. The supply channel 8 can also contain substantially fuel-free air.

During the subsequent downward stroke of the piston 5 the air flows from the transfer channels into the combustion chamber 3 as soon as the transfer ports 13 and 16 have been opened by the piston 5. Fuel/air mixture flows from the crankcase 4 into the combustion chamber 3. The substantially fuel-free air out of the transfer channels 12 and 15 scavenges the exhaust gases of the previous cycle from the combustion chamber 3 through the exhaust 17.

In the subsequent upward stroke of the piston 5 the mixture in the combustion chamber 3 is compressed while at the same time fuel/air mixture for the following combustion step is taken into the crankcase 4. In the area of the top dead center of the piston 5 the fuel/air mixture is ignited in the combustion chamber 3. The exhaust gases of the combustion chamber 3 escape as soon as the exhaust 17 has been released by the piston 5. Combustion air and fresh air flow through the transfer channels 12, 15 into the combustion chamber 3.

In particular at low engine speed of the two-stroke engine 1 strong pulsations occur in the intake channel 27. These pulsations have the effect that the fuel that has been taken in through the main fuel opening 34 and the auxiliary fuel openings 35 into the mixture channel 10 flow back into the clean chamber 23 of the air filter 18. The flow conducting element 24 deflects backwardly pulsing fuel relative to the longitudinal axis 47 of the intake channel radially outwardly into the annular section 40 of the choke element 25. In the annular section 40 the fuel will precipitate. The annular section 40 is curved toward the flow conducting element 24 and toward the longitudinal axis 47 of the intake channel. The precipitated fuel on the choke element 25 flows to the central opening 39 and is entrained by the incoming combustion air toward the intake channel 27. As a result of the separation of the annular section 40 into the two ring halves 42 and 43, only minimal quantities of fuel flow from the mixture channel 10 into the supply channel 8. In the area of the throttle 30 no partition is arranged into intake channel 27. However, an additional separation of supply channel 8 and mixture channel 10 in this area can be provided.

Figure 3:
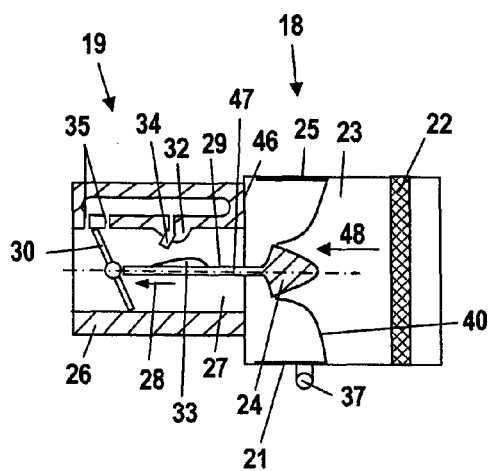
FIG. 3 shows a carburetor and air filter of the internal combustion engine of FIG. 1 with the choke element in the choke position.

When starting the two-stroke engine 1, a rich fuel/air mixture is to be supplied to the two-stroke engine 1. For this purpose, the taken-in combustion air quantity is reduced by the choke element 25. At the same time, the vacuum in the intake channel 27 is increased so that an increased amount of fuel is taken in through the fuel openings 34 and 35 into the intake channel 27. For actuating the choke element 25, the actuating element 37 is moved parallel to the longitudinal axis 47 of the intake channel, as illustrated in FIG. 1. In FIG. 3, the choke element 25 is shown in a position after movement in the direction of arrow 48 has taken place. For the actuation of the choke elements 25 a rotation of the actuating element 37 can also be provided which rotation causes a rotation of the annular section 40 and of the external cylinder 38 about the longitudinal axis 47 of the intake channel. By means of a thread, not illustrated in the Figures, this rotational movement can be converted into a movement in the direction of the longitudinal axis 47 of the intake channel.

As shown in FIG. 3, in the choke position of the choke element 25 the flow conducting element 24 is arranged in the central opening 39 of the annual section 40. The flow conducting element 24 closes off the central opening 39 with the exception of a narrow annular gap. In the embodiment according to FIGS. 1 to 3, only in the mixture channel 10 a Venturi section is formed. In the supply channel 8 no cross-sectional reduction is provided in the carburetor 19.

Figure 4:
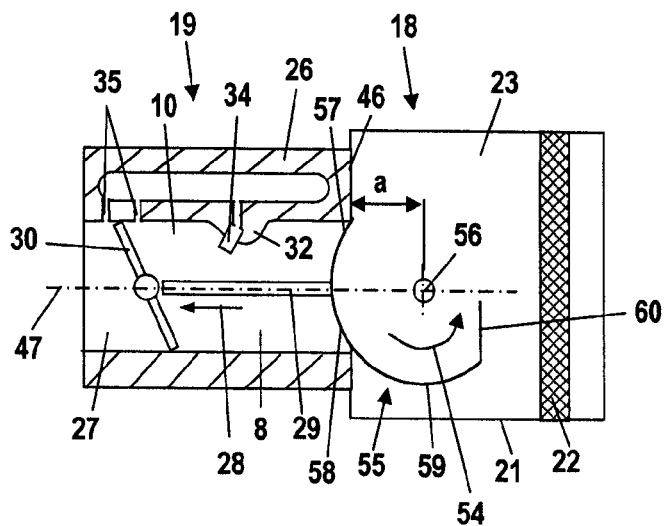
FIG. 4 is a schematic illustration of the carburetor and the air filter of the internal combustion engine of FIG. 1 with a different embodiment of a choke element.
Figure 5:
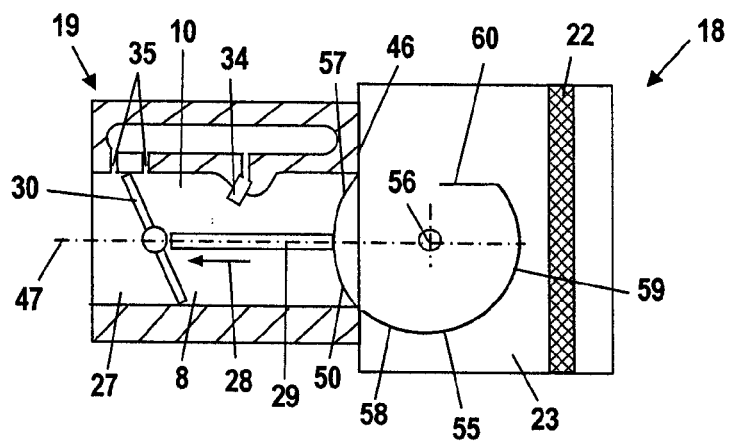
FIG. 5 shows a carburetor and air filter of FIG. 4 with the choke element in the open position.

In FIGS. 4 and 5, another embodiment of a choke element 55 is illustrated. The same reference numerals as in FIGS. 1 through 3 indicate same components. In the carburetor 19 the suction channel 27 with the longitudinal axis 47 is formed. The partition 29 divides the intake channel 27 into a supply channel 8 and a mixture channel 10 that are connected as illustrated in FIG. 1 to the two-stroke engine 1. The main fuel opening 34 opens into the mixture channel 10. In the area of the mixture channel 10 a Venturi section 32 is formed within the intake channel 27. However, no Venturi section is provided on the partition 29.

The choke element 55 is supported in the clean chamber 23 of the air filter 18 so as to be pivotable about axis of rotation (pivot axis) 56. The axis of rotation 56 extends at a spacing a to the end face 46 of the carburetor 19 and at the level of the longitudinal axis 47 of the intake channel. The longitudinal axis 47 of the intake channel intercepts the axis of rotation 56. The choke element 55 is of a part-cylindrical configuration and has a cover 60 at the side facing the air filter element 22 in the choke position. The choke element 55 has a first area 58 that in the choke position illustrated in FIG. 4 is located in a recess 57 at the end face 46 of the carburetor 19 and closes off the intake opening 50 of the intake channel 27. For taking in a defined quantity of combustion air, the first area 58 can have openings of defined size through which combustion air can be taken in. The first area 58 adjoins tightly the partition 29 in the intake channel 27. A second area 59 adjoins the area 58 and, in the choke position, is arranged in the clean chamber 23 of the air filter 18. For opening the choke element 55 the choke element 55 is pivoted about axis of rotation 56 in the direction of the arrow 54. In FIG. 5, the choke element 55 is shown in the open position.

In the open position the choke element 55 has been pivoted by 90 degrees about axis of rotation 56. The intake opening 50 into the intake channel 27 is completely released. The first area 58 of the choke element 55 adjoins the intake channel wall in the area of the intake opening 50. The second area 59, viewed in the direction of the longitudinal axis 47 of the intake channel, is arranged between the intake opening 50 and the air filter element 22 and shields the air filter element 22 relative to fuel that passes from the intake channel 27 into the clean chamber 23. The cover 60 is positioned parallel to the longitudinal axis 47 of the intake channel and prevents that fuel hitting the second area 59 can reach the air filter element 22. The fuel precipitates on the choke element 55 and is guided by the areas 59 and 58 to the intake channel 27. It can be provided to arrange the choke element 25 in such a way that the first area 58 adjoins the mixture channel 10 in the open position.

Figure 6:
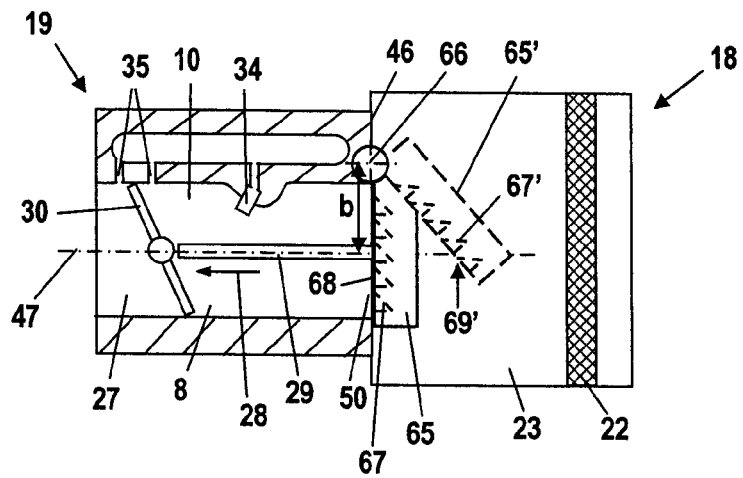
FIG. 6 is a schematic illustration of the air filter and carburetor of the internal combustion engine of FIG. 1 with a further embodiment of a choke element.

FIG. 6 shows a further embodiment of a choke element 65. The choke element 65 is arranged in the clean chamber 23 of the air filter 18 so as to be pivotable about axis of rotation 66. The axis of rotation 66 is arranged on the end face 46 of the carburetor 19 at a spacing b relative to the longitudinal axis 47 of the intake channel. The spacing b is greater than the radius of the intake channel 47 so that the axis of rotation 66 is arranged outside of the intake channel 27. The axis of rotation 66 is arranged on the side of the intake channel 27 facing the mixture channel 10. The choke element 65 has a rib structure 67 on which the fuel is precipitated that flows in from the intake channel 27 in the direction of the air filter 18. The choke element 65 has an area 68 that covers the intake opening 50 and is provided with the rib structure 67. In FIG. 6 the open position of the choke element 65' is indicated in dashed lines. In this position, the area 68 is pivoted away from the intake opening 50 and is arranged, viewed in the direction of the longitudinal axis 47 of the intake channel, between the intake opening 50 and the air filter element 22. The rib structure 67 is designed such that, in the open position of the choke element 65, fuel flows to the front end 69' of the choke element 65 facing the intake channel 27 and is entrained by the incoming combustion air.

Figure 7:
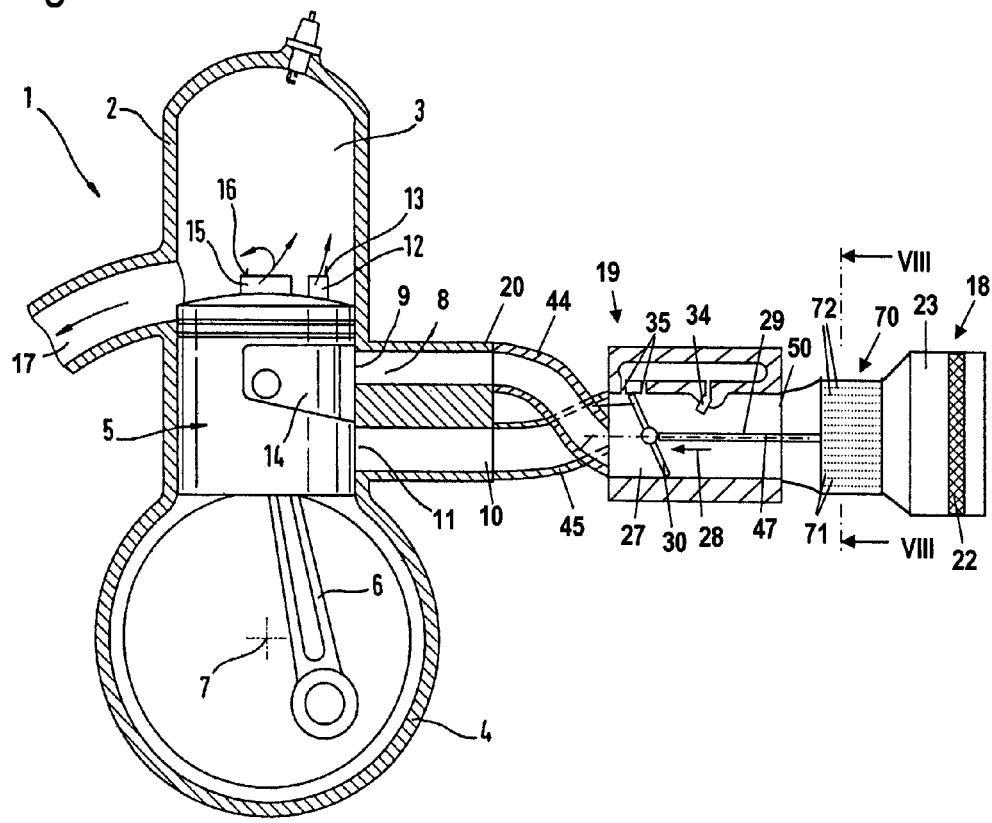
FIG. 7 shows an embodiment of an internal combustion engine.

FIG. 7 shows a two-stroke engine 1 which corresponds essentially to that of two-stroke engine 1 of FIG. 1. Same reference numerals characterize the same components in both Figures. The two-stroke engine 1 has a carburetor 19 with an intake channel 27 in which a partition 29 is arranged. The partition 29 extends into the clean chamber 23 of the air filter 18. In the flow direction between the air filter element 22 and the carburetor 19, a shielding element 70 is arranged that prevents that fuel from the intake channel 27 can reach the air filter element 22. The shielding element 70 has a plurality of passages 71 that are separated from one another by walls 72.

The shielding element 70 is arranged so as to adjoin the partition 29 so that no fuel can flow from the mixture channel 10 into the supply channel 8.

Figure 8:
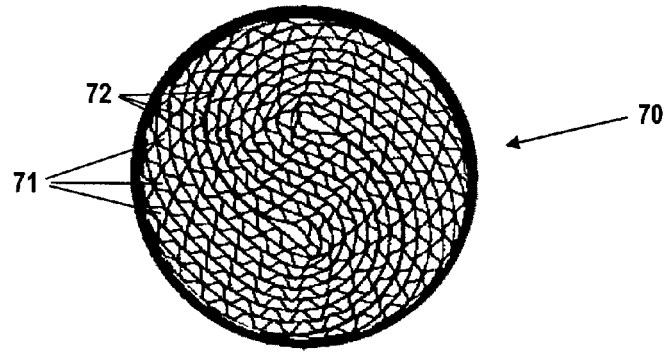
FIG. 8 is a section along the section line VIII-VIII of FIG. 7.

In FIG. 8 a section of the shielding element 70 is illustrated. The shielding element 70 has a honeycomb structure with a plurality of walls 72 that separate from one another individual channel-like passages 71. The passages 71 extend parallel to the longitudinal axis 47 of the intake channel 9. As a result of the large surface area created by the walls 72, fuel from the intake channel 10 precipitates on the walls 72 and cannot reach the air filter element 22. The multi-passage element 70, for example, can be configured as an uncoated catalyst element. However it can also be provided that the shielding element 70 has an open-pore foam in which a plurality of non-uniform passages 71 are formed.

The specification incorporates by reference the entire disclosure of German priority document 10 2006 024 078.2 having a filing date of May 23, 2006.

While specific embodiments of the invention have been shown and described in detail to illustrate the inventive principles, it will be understood that the invention may be embodied otherwise without departing from such principles.

What is claimed is:

1. An internal combustion engine comprising:
   an intake channel for supplying fuel and combustion air;
   a carburetor, wherein a section of the intake channel is formed in the carburetor;
   at least one fuel opening that opens into the intake channel within the carburetor;
   an air filter;
   wherein the intake channel has an intake opening that is connected to a clean chamber of the air filter, wherein the internal combustion engine takes in air through at least one filter element of the air filter;
   a choke element arranged in the clean chamber and moveable into a choke position and into an open position;
   wherein the choke element shields the at least one filter element relative to the intake opening when in the open position; and
   wherein the choke element has an annular section with a central opening and is provided with a flow conducting element, wherein the flow conducting element overlaps the central opening viewed in a direction of the longitudinal axis of the intake channel.

2. The internal combustion engine according to claim 1, wherein the carburetor has a carburetor housing having an end face wherein the end face is connected to a filter housing of the air filter.

3. The internal combustion engine according to claim 1, wherein the carburetor has a partition arranged in the intake channel, wherein the partition divides the intake channel into a mixture channel and a supply channel for supplying substantially fuel-free air, wherein the at least one fuel opening opens into the mixture channel.

4. The internal combustion engine according to claim 3 in the form of a two-stroke engine having a crankcase, a cylinder and a piston, wherein the piston is arranged reciprocatingly in the cylinder, wherein the piston delimits a combustion chamber in the cylinder, wherein the intake channel opens into the crankcase, wherein the crankcase communicates with the combustion chamber through at least one transfer channel in at least one position of the piston, wherein the supply channel supplies substantially fuel-free air to the at least one transfer channel.

5. The internal combustion engine according to claim 1, wherein the flow conducting element projects into the clean chamber of the air filter and outwardly deflects fuel flowing back from the intake channel into the air filter in a deflection direction away from a longitudinal axis of the intake channel.

6. The internal combustion engine according to claim 1, wherein the annular section is curved toward the central opening in a direction toward the intake opening.

7. The internal combustion engine according to claim 1, wherein the annular section has rotational symmetry relative to the longitudinal axis of the intake channel.

8. The internal combustion engine according to claim 1, wherein the carburetor has a partition dividing the intake channel into a supply channel for supplying substantially fuel-free air and into a mixture channel, wherein the annular section has at least one web dividing the annular section into a first ring half facing the supply channel and into a second ring half facing the mixture channel.

9. The internal combustion engine according to claim 5, wherein at least one section of the choke element is moveable in a direction of the longitudinal axis of the intake channel.

* * * * *